United States Patent
Goldberg et al.

(10) Patent No.: US 10,019,523 B2
(45) Date of Patent: Jul. 10, 2018

(54) DIVERSIFYING SEARCH RESULTS

(71) Applicant: eBay Inc., San Jose, CA (US)

(72) Inventors: David Goldberg, Palo Alto, CA (US);
Miroslav Melichar, Campbell, CA (US); Michael Ching, San Jose, CA (US); Davide Libenzi, San Jose, CA (US)

(73) Assignee: eBay Inc., San Jose, CA (US)

( * ) Notice: Subject to any disclaimer, the term of this patent is extended or adjusted under 35 U.S.C. 154(b) by 440 days.

(21) Appl. No.: 14/550,708

(22) Filed: Nov. 21, 2014

(65) Prior Publication Data

US 2016/0147755 A1 May 26, 2016

(51) Int. Cl.
*G06F 17/30* (2006.01)

(52) U.S. Cl.
CPC .............. *G06F 17/30867* (2013.01)

(58) Field of Classification Search
None
See application file for complete search history.

(56) References Cited

U.S. PATENT DOCUMENTS

| | | | |
|---|---|---|---|
| 7,003,513 B2 * | 2/2006 | Geiselhart | G06F 17/30648 |
| 7,194,454 B2 | 3/2007 | Hansen et al. | |
| 7,565,358 B2 | 7/2009 | Minogue et al. | |
| 7,797,425 B2 * | 9/2010 | Ettle | H04L 45/12 |
| | | | 370/236 |
| 7,831,548 B1 * | 11/2010 | Round | G06F 17/30893 |
| | | | 707/609 |
| 7,930,287 B2 * | 4/2011 | Galvin | G06F 17/30864 |
| | | | 707/706 |
| 8,060,466 B1 * | 11/2011 | Round | G06F 17/30893 |
| | | | 707/609 |
| 8,082,345 B2 * | 12/2011 | Ettle | H04L 45/12 |
| | | | 370/216 |
| 8,468,244 B2 * | 6/2013 | Redlich | G06Q 10/06 |
| | | | 705/50 |
| 8,478,677 B2 | 7/2013 | Solomon | |

(Continued)

OTHER PUBLICATIONS

Agrawal, Rakesh, Sreenivas Gollapudi, Alan Halverson, and Samuel Ieong. "Diversifying search results." In Proceedings of the second ACM international conference on web search and data mining, pp. 5-14. ACM, 2009.*

*Primary Examiner* — Farhan Syed
(74) *Attorney, Agent, or Firm* — Shook, Hardy & Bacon L.L.P.

(57) ABSTRACT

Disclosed are a system comprising a computer-readable storage medium storing at least one program, and a computer-implemented method for generating search results. A data access module accesses search results data indicative of a plurality items and that is indicative of ranking values of the plurality of items. A controller module generates page data based on the search results data. The controller module selects a first item from the plurality of items. A diversification module accesses a first rule of the page data. The diversification module determines a deviance value and a reordering-cost value of a second item from the plurality of items. The controller module can select, based at least on a first combination of the deviance and the reordering-cost values of the second item, the second item for placement ahead of the first item on the page data.

15 Claims, 8 Drawing Sheets

(56) References Cited

U.S. PATENT DOCUMENTS

| | | | | |
|---|---|---|---|---|
| 8,583,640 | B2* | 11/2013 | Zhang | G06F 17/3053 |
| | | | | 707/728 |
| 8,660,849 | B2* | 2/2014 | Gruber | G06F 17/3087 |
| | | | | 704/275 |
| 8,892,506 | B2* | 11/2014 | Round | G06F 17/30893 |
| | | | | 707/609 |
| 9,152,708 | B1* | 10/2015 | He | G06F 17/30781 |
| 9,189,552 | B2* | 11/2015 | Riley | G06F 17/30 |
| 2007/0147269 | A1* | 6/2007 | Ettle | H04L 45/12 |
| | | | | 370/254 |
| 2008/0189269 | A1* | 8/2008 | Olsen | G06F 17/30864 |
| 2009/0119276 | A1* | 5/2009 | Neron | G06F 17/30864 |
| 2009/0254572 | A1* | 10/2009 | Redlich | G06Q 10/06 |
| 2011/0019586 | A1* | 1/2011 | Ettle | H04L 45/12 |
| | | | | 370/254 |
| 2012/0221562 | A1* | 8/2012 | Zhang | G06F 17/3053 |
| | | | | 707/728 |
| 2013/0151370 | A1* | 6/2013 | Round | G06F 17/30893 |
| | | | | 705/26.7 |
| 2014/0129540 | A1* | 5/2014 | Riley | G06F 17/30 |
| | | | | 707/709 |
| 2015/0066894 | A1* | 3/2015 | Riley | G06F 17/30 |
| | | | | 707/709 |
| 2015/0317400 | A1* | 11/2015 | Charkov | G06F 17/30867 |
| | | | | 707/724 |
| 2015/0379148 | A1* | 12/2015 | Riley | G06F 17/30 |
| | | | | 707/707 |
| 2016/0162574 | A1* | 6/2016 | Gorodilov | G06Q 10/10 |
| | | | | 707/722 |

* cited by examiner

DIVERSIFYING SEARCH RESULTS

TECHNICAL FIELD

Example embodiments of the present application relate generally to processing data and, more particularly in an embodiment, to digital searches and/or recommendations.

BACKGROUND

A search engine can receive one or more search terms and can generate search results by searching a data set based on the one or more search terms. For example, items of the data set can be selected based on the relevance of the search terms to the respective items. A variety of methods can be used to account for information used to determine the relevancy of items to improve the accuracy of the search engine. For example, providing context data to the search engine can provide meaning or context to the search terms and aid in determining relevancy of items. Context data can be generated from the user's previous search history or Internet usage. The search results can be returned to the user device for display on a search results page in an ordered list based on the relevancy of the items of the search result.

BRIEF DESCRIPTION OF THE DRAWINGS

In the drawings, which are not necessarily drawn to scale, like numerals can describe similar components in different views. Like numerals having different letter or numeric suffixes can represent different instances of similar components. The drawings illustrate generally, by way of example, but not by way of limitation, various embodiments discussed in the present document.

DETAILED DESCRIPTION

Figure 1:
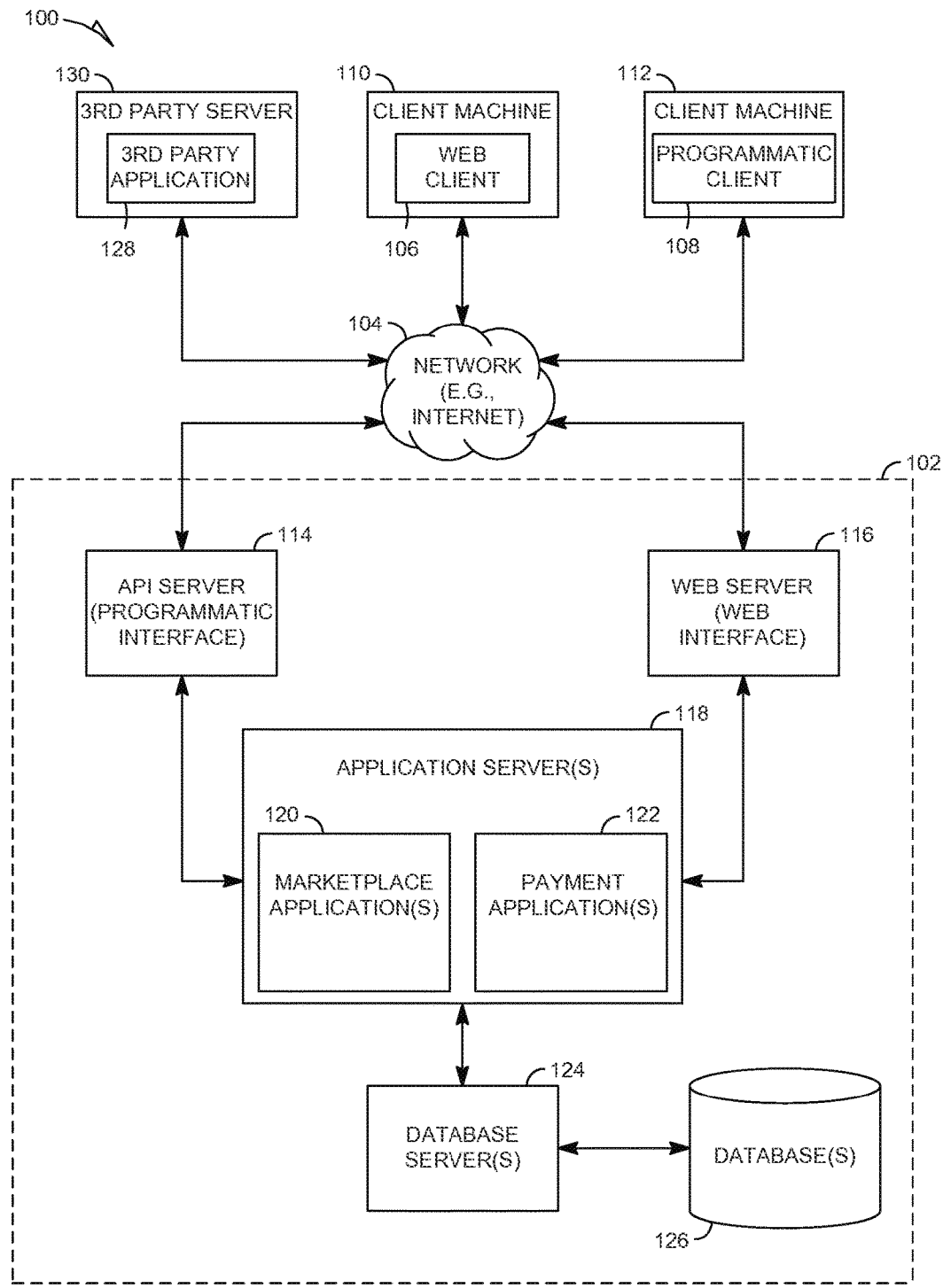
FIG. 1 is a network diagram depicting a client-server system, within which one example embodiment can be deployed.

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as can be included within the spirit and scope of the disclosure as defined by the appended claims. In the following description, specific details are set forth in order to provide a thorough understanding of the subject matter. Embodiments can be practiced without some or all of these specific details. In addition, well known features may not have been described in detail to avoid unnecessarily obscuring the subject matter.

In accordance with the present disclosure, components, process steps, and/or data structures are implemented using various types of operating systems, programming languages, computing platforms, computer programs, and/or like machines. In addition, those of ordinary skill in the art will recognize that devices, such as hardwired devices, field programmable gate arrays (FPGAs), application specific integrated circuits (ASICs), or the like, can also be used without departing from the scope and spirit of the concepts disclosed herein. Embodiments can also be tangibly embodied as a set of computer instructions stored on a computer readable medium, such as a memory device.

Example methods and systems for processing search requests, which are embodied on electronic devices, are described. In the following description, for purposes of explanation, numerous specific details are set forth in order to provide a thorough understanding of example embodiments. It will be evident, however, to one skilled in the art, that the present inventive subject matter can be practiced without these specific details.

Digitally stored databases can include information related to searchable and/or sortable items, such as products, services, content, real-estate, webpages, web resources, and any like data. A search engine can interface with such a database to facilitate searching the database for items matching a search query. A search engine typically scores or ranks the items of a search result based on their relevancy with respect to the search terms and, possibly, context information (e.g., search history, location, time, and the like). For example, online marketplaces can give a score to each item based on an estimate of a probability that the user will buy the item. Each item can be scored individually, and then the items can presented in order with the items most likely to be purchased at the top.

However, there are some situations where listing the search results in order of their scores does not effectively provide the data for which the user searched. For example, suppose a user device submits a search query to an online marketplace. The search engine can produce search results including 40 items, wherein 20 are from a first brand and 20 from a second brand. Further, suppose that all of the first brand's items have scores that are greater than the scores of the second brand's items. Then, the first 20 results displayed on the search results page (SRP) would be the first brand's items, potentially giving the user an incorrect impression that the online marketplace only carries items from the first brand. Furthermore, it can be difficult for the user to comparison shop if the user has to view deep into the search results page (SRP) for items having different characteristics or attributes (such as brands). It can be better to show instead at least one item from the second brand near the top of the SRP, such as high enough to be "above the fold" so that the user is more likely to see the item from the second brand. In other words, the online marketplace can take diversity into account in generating and displaying the SRP data.

Example embodiments disclosed herein can take into account one or more dimensions of diversity to generate SRP data that can effectively provide search results data to the user. For example, each dimension of diversity can include a "constraint" in the form of a maximum and/or minimum number of items matching specified attributes. For example, for a search query "flat screen TV", a constraint can specify to the search system to generate SRP data that includes at least 10% "new" conditioned items and at most 50% with a brand of "BRAND 1."

It will be appreciated that in some example embodiments that the constraint can be a "soft" constraint in the sense that the search system need not satisfy the constraint. The search system may not satisfy the constraint when, for example, satisfying the constraint would lead to poor quality SRP data by including items with a low level of relevancy to the search query, or when multiple constraints conflict. Accordingly, soft constraints are can be referred to as "soft rules." Furthermore, by way of illustration only, and not by way of limitation, one or more examples are described herein as employing soft rules. It will be appreciated, however, that alternative embodiments can employ one or more hard rules, which are to be satisfied by the search system.

Such an approach facilitates customizing the search behavior for a specific query by putting info into a database indexed by query. It will be appreciated that, in many situations, the maximum/minimum constraints would not likely be violated. Accordingly, the selection of the exact values of the constraints can have a negligible effect on performance. In this way, implementing example embodiments disclosed herein can perform robustly with respect to a wide selection of design variables.

As stated, each soft rule need not be satisfied by the final SRP data. As such, the terms "minimum," "maximum," "at least," and "at most" refer to soft constraints that can be violated and do not necessarily refer to absolute constraints.

By way of further explanation only, various example embodiments disclosed herein can be viewed conceptually as an "agent" system. That is, each dimension of diversity can have a corresponding agent (e.g., a computer program or function executed by a processor) that monitors its corresponding soft rule as a controller generates the SRP data. For instance, the SRP data can be generated by iteratively placing items from the search results data into the SRP data. By default, the highest ranked unplaced item can be placed into the SRP data. At each iteration, the agents evaluate their respective soft rule in view of the current construction of the SRP data. If any soft rule is violated, the corresponding agent scans through the unplaced items of the search results data and selects an unplaced item that would improve the SRP data with respect to its soft rule. The unplaced item selected by an agent can be referred to as its candidate item to be placed into the SRP ahead of the default unplaced item.

Multiple agents can select different candidate items on the same iteration. The controller can select one of the candidate items based on scores assigned to the candidate items. These scores are referred to herein as adjusted diversity scores (or "adjusted diversity values"), each of which is formed by summing two terms based on reward-cost contributions. The first term is referred to herein as the deviance of the rule. Deviance can be measured based on determining how much the placed items of the SRP deviates from the corresponding agent's soft rule. The greater the deviation, the more the need for placing the candidate item for improving diversity in the dimension of the soft rule, and thus the greater the reward for placing the candidate item with respect to diversity. Accordingly, the deviance can measure the benefit, in view of the soft rule, by replacing the default item with the candidate item. In this sense, the deviance can be viewed as a "diversity reward."

The second term is referred to herein as the reordering cost, and it involves the candidate item. In particular, there can be a penalty for placing the candidate item into the SRP ahead of the default item because the candidate item has a lower ranking than the default item in terms of relevancy to the search query and other attributes. The greater the difference in the ranking values, the greater the reordering cost.

Taking into account both the deviance and the reordering costs, example embodiments described herein can introduce diversity to the SRP data while not overly inhibiting the display of similar items. As such, the diversification process can generate SRP data that, for example, facilitate the display of search results data in a way favorable for comparing the large data sets. Furthermore, the example embodiments can gracefully account for multiple dimensions of diversity.

FIG. 1 is a network diagram depicting a client-server system 100, within which one example embodiment can be deployed. A networked system 102, in the example form of a network-based marketplace or publication system, provides server-side functionality, via a network 104 (e.g., the Internet or wide area network (WAN)), to one or more clients. FIG. 1 illustrates, for example, a web client 106 (e.g., a browser), and a programmatic client 108 executing on respective client machines 110 and 112. Herein, the client machine 110 can be referred to as a "client device" or "user device" in various applications.

An application program interface (API) server 114 and a web server 116 are coupled to, and provide programmatic and web interfaces respectively to, one or more application servers 118. The application servers 118 host one or more marketplace applications 120, and payment applications 122. The application servers 118 are, in turn, shown to be coupled to one or more database servers 124 that facilitate access to one or more databases 126.

The marketplace application(s) 120 can provide a number of marketplace functions and services to users that access the networked system 102. The payment application(s) 122 can likewise provide a number of payment services and functions to users. The payment application(s) 122 can allow users to accumulate value (e.g., in a commercial currency, such as the U.S. dollar, or a proprietary currency, such as "points") in accounts, and then later to redeem the accumulated value for items that are made available via the marketplace application(s) 120.

Further, while the system 100 shown in FIG. 1 employs a client-server architecture, the present inventive subject matter is, of course, not limited to such an architecture, and could equally well find application in a distributed, or peer-to-peer, architecture system, for example. The various marketplace and payment applications 120, 122 could also be implemented as standalone software programs, which do not necessarily have networking capabilities.

In addition, while the various marketplace and payment applications 120, 122 have been described above as having separate functionalities, in alternative embodiments these functionalities can be performed by any one or more of the various marketplace and payment applications 120, 122.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 can, for example, be a seller application (e.g., the TURBOLISTER™ application developed by EBAY INC.™, of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server 130, as having programmatic access to the networked system 102 via the programmatic interface provided by the API server 114. For example, the third party application 128 can, utilizing information retrieved from the networked system 102, support one or more features or functions on a website hosted by the third party. The third party website can, for example, provide one or more promotional, marketplace, or payment functions that are supported by the relevant applications of the networked system 102.

Example Mobile Device

Figure 2:
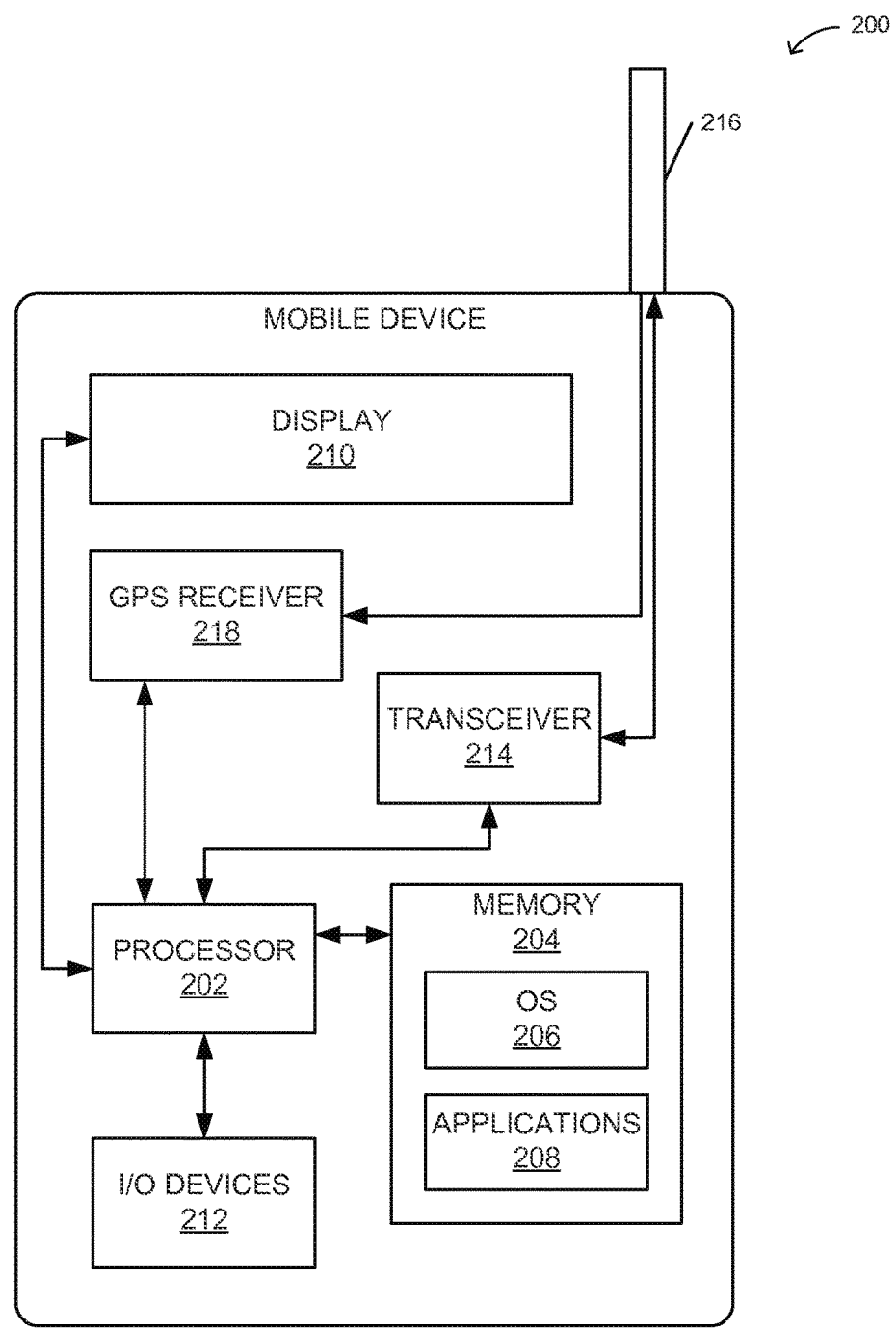
FIG. 2 is a block diagram illustrating a mobile device, according to an example embodiment.

FIG. 2 is a block diagram illustrating a mobile device 200, according to an example embodiment. The mobile device 200 can include a processor 202. The processor 202 can be any of a variety of different types of commercially available processors suitable for mobile devices 200 (for example, an XScale architecture microprocessor, a microprocessor without interlocked pipeline stages (MIPS) architecture processor, or another type of processor). A memory 204, such as a random access memory (RAM), a Flash memory, or other type of memory, is typically accessible to the processor 202. The memory 204 can be adapted to store an operating system (OS) 206, as well as application programs 208, such as a mobile location-enabled application that can provide location based services (LBSs) to a user. The processor 202 can be coupled, either directly or via appropriate intermediary hardware, to a display 210 and to one or more input/output (I/O) devices 212, such as a keypad, a touch panel sensor, a microphone, and the like. Similarly, in some embodiments, the processor 202 can be coupled to a transceiver 214 that interfaces with an antenna 216. The transceiver 214 can be configured to both transmit and receive cellular network signals, wireless data signals, or other types of signals via the antenna 216, depending on the nature of the mobile device 200. Further, in some configurations, a GPS receiver 218 can also make use of the antenna 216 to receive GPS signals.

Example Search Systems

Figure 3A:
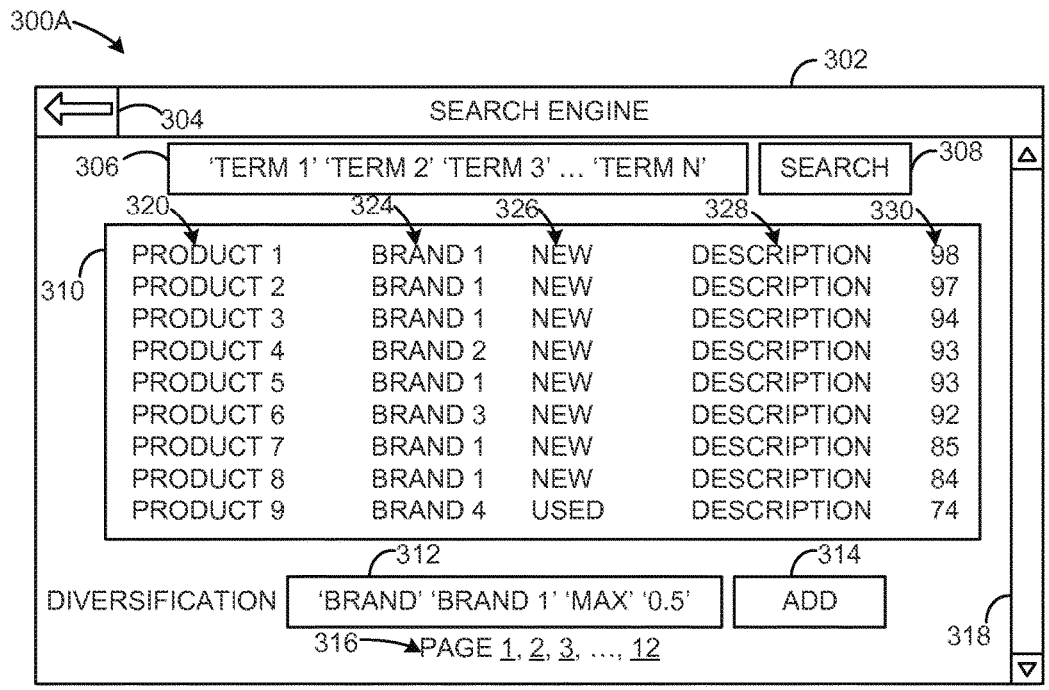
FIGS. 3A and 3B are interface diagrams illustrating example user interfaces of a web resource with multiple display elements delivered to a user device by a search system, according to an example embodiment.
Figure 3B:
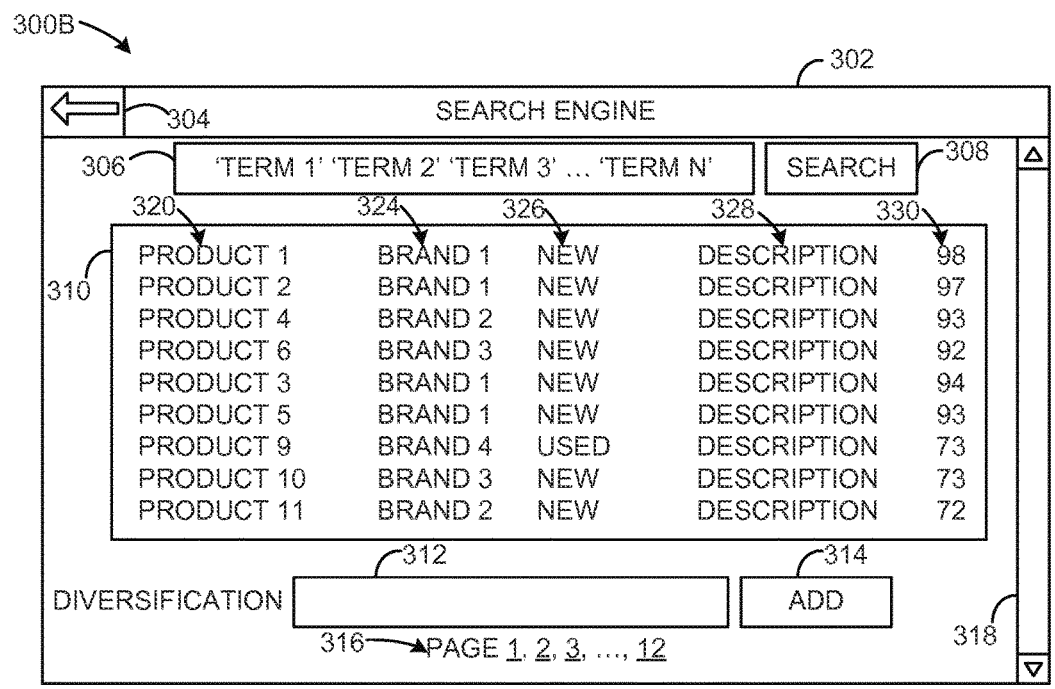

FIGS. 3A and 3B are interface diagrams illustrating example user interfaces 300A, 300B of a web resource with multiple display elements delivered to a user device by a search system, according to an example embodiment. A web resource can correspond to a webpage delivered to the user device or data delivered over the Internet to a software application executing on the user device. The user device can correspond to the client machine 110 of FIG. 1. The search system can be embodied or provided by the networked system 102.

For illustration purposes only, and not by way of limitation, FIGS. 3A and 3B illustrate a use case in which the search system provides SRP data to the user device for display. In particular, FIG. 3A can represent SRP data displayed on the user device prior to applying one or more soft rules, and FIG. 3B can represent the SRP data after applying the one or more diversity the rules. It will be appreciated that, while FIGS. 3A and 3B are described in the context of e-commerce and online marketplaces, alternative embodiments are not limited to searches for e-commerce items, but can be related to any searchable information in accordance with the description herein.

The user interface 300A includes a frame 302 for providing a user interface to receive search query input from the user and for displaying the resulting SRP data. The frame 302 includes elements 304-318. The element 304 can correspond to a user selectable control element for navigating to the previous display of the user interface 300A, such as the previous website or the previous screen of an application. The element 306 can correspond to a text box for receiving search query data. For instance, the element 306 can receive text data from the user. The text data can specify one or more search terms, such as "TERM 1," "TERM 2," "TERM 3," . . . , "TERM N." The element 308 can correspond to a user selectable control element, such as a button, for initiating a search query using the user input provided to the element 306. The element 310 can correspond to a display element for displaying the SRP data resulting from the search query in response to a selection of the element 308.

The element 312 can correspond to a text box for receiving user input related to soft rule parameters. For instance, the element 312 can receive text data for specifying a new soft rule that is indicative of a diversity characteristic to be applied to the SRP data. As will be described later in greater detail, a soft rule can be specified by a threshold condition with respect to a threshold type and a threshold value for the number of matching items to be included in the SRP data. The matching items have an attribute-value pair that matches an attribute-template pair of the soft rule. In the illustrated example embodiment, the user input provided to the element 312 specifies an attribute-template pair ("BRAND", "BRAND 1") and a threshold condition ("MAX", "0.5"). Regarding the attribute-template pair, the first term can specify the attribute (e.g., "BRAND") and the second term can specify the template value of the attribute (e.g., "BRAND 1"). Regarding the threshold condition, the first term can specify the threshold type (e.g., "MAX") and the second term can specify the threshold value (e.g., "0.5"). As such, the illustrated user input specifies a soft rule that corresponds to a linguistic rule of "at most half of the SRP should be items from BRAND 1." The element 314 can correspond to a user selectable element, such as a button, for adding a soft rule in accordance with the user input provided to the element 312.

In alternative example embodiments, the user interface 300A omits elements 312 and 314. That is, the user device does not provide user data to the search system for specifying soft rules. Rather, the search system determines the soft rules.

The element 316 can include one or more user selectable elements for navigating through a plurality of SRP displays. The element 310 can be a user selectable element for scrolling the displayed items of the element 310.

The SRP data displayed by the element 310 can include a variety of information. For example, for each item of the SRP, the element 310 can display an item title (e.g., via column 320), a brand attribute (e.g., via column 324), a condition attribute (e.g., via column 326), a description (e.g., via column 328), and a ranking value (e.g., via column 330). In alternative embodiments, more or fewer elements can be displayed by the element 310. For example, in one example embodiment, only columns 320, 328 are displayed to the user.

The ranking value of an item can be a score or a ranking position. The score can be based on a number of characteristics, such as, but not limited to relevancy score, popularity, seller rating, seller history data, price, listing date, listing end date, discounts, and/or a combination of one or more of the like characteristics.

FIG. 3B is an interface diagram illustrating the example user interface 300B, which can correspond to the user interface 300A after a soft rule has been applied. In particular, the soft rule can correspond to the user input shown in the element 312 of FIG. 3A and that is applied to the SRP data in response to a user selection of the element 314. Accordingly, elements common to the user interfaces 300A, 300B of FIGS. 3A and 3B share common reference indicia, and only differences between the interfaces are described herein for the sake of brevity.

As stated, the soft rule corresponds to a constraint of at most half of the displayed SRP corresponding to items from "Brand 1." Six of the nine items of the SRP shown in the element 310 of FIG. 3A are from Brand 1. As such, the search system reorders the search results data to generate the SRP displayed in the element 310 of FIG. 3B. In particular, items corresponding to the PRODUCT 4 from BRAND 2 and PRODUCT 6 from BRAND 3 are moved ahead of PRODUCT 3 and PRODUCT 5 from BRAND 1. Note that PRODUCTS 3-6 have similar ranking values. Accordingly, the reordering cost is relatively low and thus the search system is relatively uninhibited from placing PRODUCTS 4 and 6 ahead of PRODUCTS 3 and 5. Moreover, the search system has omitted PRODUCTS 7 and 8 from the SRP and has added PRODUCTS 10 and 11 in order to meet the soft rule.

Figure 4:
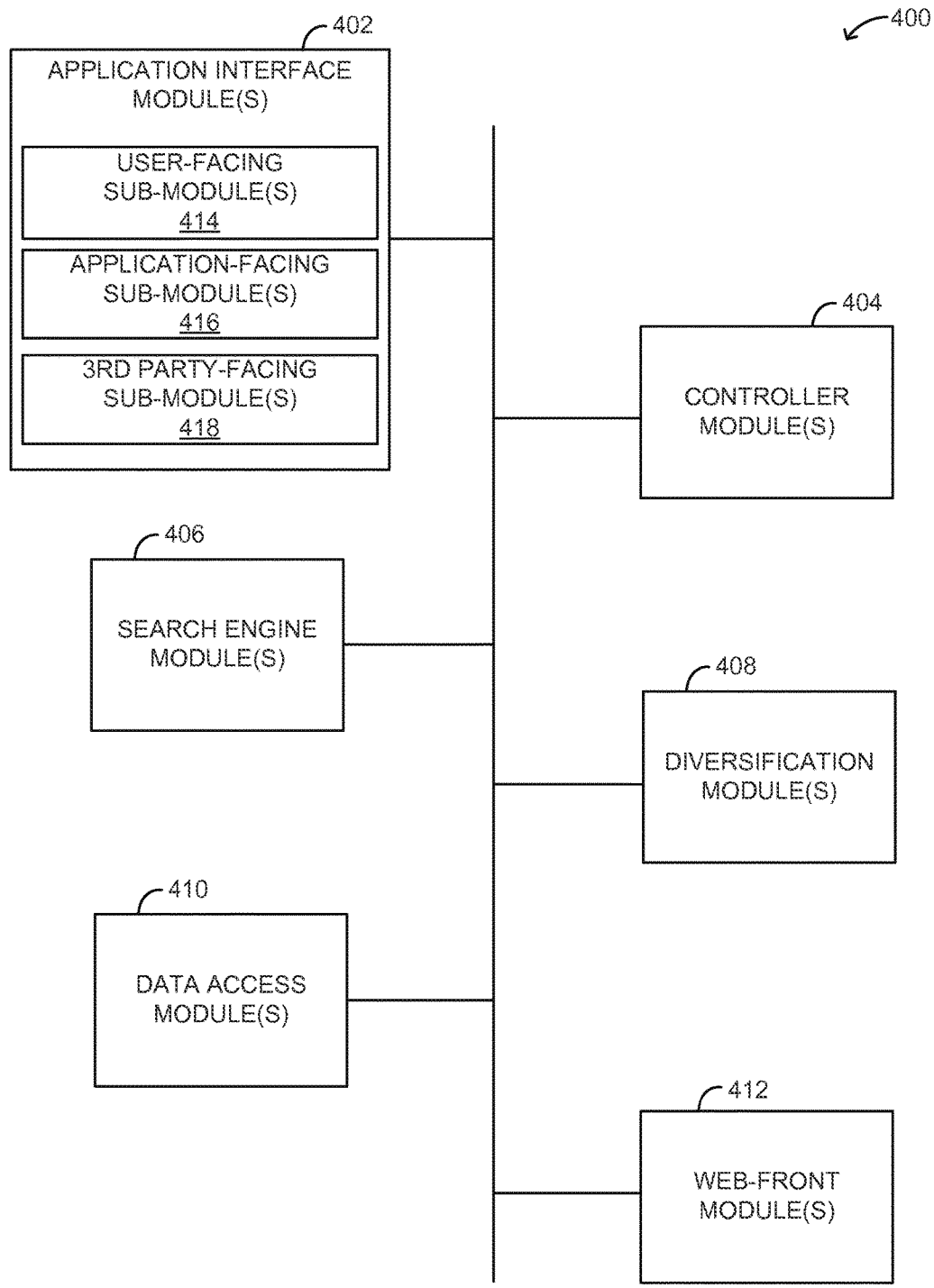
FIG. 4 is a block diagram illustrating an example embodiment of a search system including multiple modules forming at least a portion of the client-server system of FIG. 1.

FIG. 4 is a block diagram illustrating an example embodiment of a search system 400 including multiple modules forming at least a portion of the client-server system 100 of FIG. 1. The modules 402-412 of the illustrated search system 400 include an application interface module(s) 402, a controller module(s) 404, a search engine module(s) 406, a diversification module(s) 408, a data access module(s) 410, and a web-front module(s) 412. The application interface module(s) 402 includes a user-facing sub-module(s) 414, an application-facing sub-module(s) 416, and a third party-facing sub-module(s) 418.

In some embodiments, the components of the search system 400 can be included in the marketplace application 120 of FIG. 1. However, it will be appreciated that in alternative embodiments, one or more components of the search system 400 described below can be included, additionally or alternatively, in other devices, such as one or more of the payment application 122, the servers 114, 116, 118, 130, the network 104, and/or the client machines 110, 112 of FIG. 1.

The modules 402-412 of the search system 400 can be hosted on dedicated or shared server machines (not shown) that are communicatively coupled to enable communications between server machines. Each of the modules 402-412 are communicatively coupled (e.g., via appropriate interfaces) to each other and to various data sources, so as to allow information to be passed between the modules 402-412 of the search system 400 or so as to allow the modules 402-412 to share and access common data. The various modules of the search system 400 can furthermore access one or more databases 126 via the database server(s) 124.

The search system 400 can facilitate receiving search requests, processing search queries, and/or providing SRP data to client machines 110, 112. In a particular example, the search system 400 can facilitate diversifying search results generated from a search engine. To this end, the search system 400 illustrated in FIG. 4 includes the application interface module(s) 402, the controller module(s) 404, the search engine module(s) 406, the diversification module(s) 408, the data access module(s) 410, and the web-front module(s) 412.

The application interface module(s) 402 can be a hardware-implemented module which can be configured to communicate data with client devices. From the perspective of the search system 400, client devices can include user devices, such as the client machine 110 of FIG. 1, and/or vendor devices, such as the application server(s) 118 of FIG. 1. The user-facing sub-module(s) 414 can interface with user devices. The application-facing sub-module(s) 416 can interface with web resources of vendor devices. The third-party-facing sub-module(s) 418 can interface with third party applications 128. In example embodiments, the search system 400 can interface with third-party applications 128 that provide web-based services, such as, but not limited to, search services, data storage, data mining, speech recognition, and like services. Accordingly, the search system 400 can provide diversified SRP data by interacting with the third party applications 128.

In operation, the application interface module(s) 402 can receive request messages corresponding to search requests and/or diversification requests. The application interface module(s) 402 can provide user devices and/or vendor devices SRP data having diversified search results.

The controller module(s) 404 can be a hardware-implemented module which can facilitate generating SRP data based on search results data for any list of items that can be ranked or ordered (collectively referred herein as "search results data"). For example, the controller module(s) 404 can generate the SRP data for display on a client device that provided a search query request. As will be described in greater detail, the controller module(s) 404, being interfaced with the diversification module(s) 408, can place items from the search results data to the SRP data based on the order of the search results data and in accordance with evaluations of one or more soft rules.

It will be understood that the SRP data can be provided directly or indirectly for display on a user device. For example, the SRP data can represent webpage data that is directly transmitted over the Internet to a user device to be rendered by a web-browser or other application that is executed on the user device. Additionally or alternatively, the SRP data can represent a list of items (e.g., products of an online marketplace) that is provided to a program (e.g., an advertisement targeting program) that selects one or more of the items. For example, data indicative of the one or more selected items can then be transmitted to a user device in a form of a digital notification (e.g., an email, an advertisement, an offer, a discount or reward, and/or any number of the like).

The search engine module(s) 406 can be a hardware-implemented module which can facilitate searching. In an example embodiment, the search engine modules(s) 406 can generate search results data by processing a search query in response to receiving a request from a user device via the user-facing sub-module(s) 414. In an alternative embodiment, the search engine module(s) 406 interfaces with a third-party application, such as a third-party search application 128, via the third party-facing sub-module(s) 418. Accordingly, in an example embodiment, the search engine module(s) 406 can obtain search results data by providing a search request to the third party search application and receiving the search results data in response to the search request. Search results data can be stored in or retrieved from the database 126 via the data access module(s) 410.

In an example embodiment, the search results data can correspond to a list of items. Additionally, the search results data can further correspond to ranking data that is suitable for ranking the items. For example, the search results data can include a ranking value or score for each of the items of the search results. Additionally or alternatively, the items of the search results can be provided in an order that is indicative of their rankings, for example, ordered from most relevant to least relevant or ordered from least relevant to most relevant. Accordingly, an example embodiment can provide an ordered search results list and can thus omit explicit ranking value data.

Furthermore, the search results data can additionally correspond to one or more attribute-value pairs for each of the items of the search results data. For example, each item can correspond to an item of an online marketplace and can have data that indicates the brand, seller, item condition, price, color, type/sub-type, and/or the like attributes usable to characterize, filter, and/or search for the item. Search results data will be described in greater detail in connection with FIG. 5.

The diversification module(s) 408 can be a hardware-implemented module which can facilitate generating diversified SRP data. The diversification module(s) 408 can be interfaced with the controller module(s) 404 and/or the search engine module(s) 406 to place items of the search results data to the SRP data. In particular, the diversification module(s) 408 can determine whether an item of the search results data should be placed ahead of the top unplaced item of the search results to meet one or more soft rules. For example, the diversification module(s) 408 can access one or more soft rules that are each indicative of a diversity characteristic for generating the SRP data.

For example, a soft rule can be indicative of a threshold condition for the number of items to be included in the SRP data that have attribute-value pairs that match an attribute-template pair. For example, a soft rule can indicate that, at most, 50% of the displayed SRP data should have a "BRAND" attribute matching "BRAND X." Accordingly, the threshold condition f can correspond to the threshold type-value pair ("MAX", 0.5). The threshold type is indicated by the first value "MAX' to indicate that the threshold value is an "at most" or "maximum" condition. The second value 0.5 (e.g., 50%) indicates the value of the threshold condition. Moreover, the attribute-template pair can correspond to ('BRAND', 'BRAND X') or 'BRAND=BRAND X' to indicative the attribute BRAND and the value 'BRAND X.' Another example soft rule can have a threshold type of 'MIN' and/or can have an attribute-template corresponding to another attribute and/or another attribute value.

In an example embodiment, the attribute-template pair can be indicative of an attribute and a wildcard indicator, such as the "*" or "ANY" tokens. For example, an attribute-template pair ('BRAND', 'ANY') and a threshold condition (MAX, 0.33) can indicate that at most 33% of the SRP data can correspond to any one BRAND.

The diversification module(s) 408 can determine diversity-reward values and reordering-cost values of items from the search results data. Moreover, the diversification module(s) 408 can determine adjusted diversity scores of an item by combining its diversity-reward value and the reordering-cost value. The diversification module(s) 408 can determine an adjusted diversity score for each diversification rule.

To further illustrate, an example soft rule specifies that the fraction of items with property P should be at least f (e.g., a "MIN" type constraint). The property P can be that an item is used, has a specified brand, is newly listed, or the like. One way to compute deviance from a soft rule is based on the number of items with P placed so far and compare it to the number to meet the soft rule. For example, suppose there are n items placed so far and that k of them have the property P. Accordingly, to meet the soft rule, at least n fitems should have the property P. If k<nf, the soft rule is not yet met so the deviance can be set to a value of nf−k. In an alternative example embodiment, the deviance can be determined as (nf−k)+, where the "+" unitary operator denotes that x+=x when x>0 and 0 otherwise.

In an example embodiment, the reorder-cost value can be computed by comparing the ranking scores of the candidate item IC and the item that would otherwise be placed Idefault. Accordingly, the reorder cost can be set as S(IC)−S(Idefault). Since items can be sorted in score order, the penalty can be nonnegative.

In an example embodiment, the adjusted diversity score can be computed using the formula: adjusted diversity score=deviance−λ×reorder cost. Consider the case where deviance>0 but an item that meets the soft rule is associated with a reorder cost larger than the deviance. Accordingly, in this case, the large reorder cost can make the adjusted diversity score negative. In other words, satisfaction of a soft rule can be mathematically "altruistic" with respect to the ranking data and with respect to other soft rules. The parameter λ can control the tradeoff between diversity and ranking.

Accordingly, one example embodiment of a formula for adjusted diversity score can be determined according to the following equation:

$$\text{adjusted diversity value} = \text{diversity reward} - \lambda \times \text{reorder cost} \quad (\text{EQ. 1})$$
$$= (nf - k)^+ - \lambda(S(I_C) - S(I_{default}))$$

In alternative example embodiments, the deviance can be computed in different ways. For example, it can be desirable to delay satisfying the soft rules so that the ranking of the search results data can be preserved. One way to do this can be accomplished by replacing (nf−k)+ with (round(nf−k))+ in Equation 1. In another embodiment, the adjusted diversity value can be computed by the following equation:

$$\text{adjusted diversity value} = \text{diversity reward} - \lambda \times \text{reorder cost} \quad (\text{EQ. 2})$$
$$= \frac{((n+2)f - k - 1)^+ -}{\lambda(S(I_C) - S(I_{default}))}$$

In Equation 2, the diversification module(s) 408 can delay generating a non-zero deviance if the soft rule can be satisfied in the next round of selection of an unplaced item. Accordingly, the order of the search results data can be maintained near the top of the SRP data and reordering can be delayed until later rounds.

In operation, the controller module(s) 404 can iteratively select items from the search results data to be placed in the SRP data based on the ranking of the items and based on the adjusted diversity scores determined by the diversification module(s) 408. For example, at each round of selection of an unplaced item, the controller module(s) 404 can check the adjusted diversity scores associated with each soft rule. In the case wherein the diversification module(s) 408 determines that more than one unplaced item should be placed ahead of the current top unplaced item (e.g., based on a non-zero positive adjusted diversity score), the controller module(s) 404 can select the item having the largest adjusted diversity score. Example methods will be described in greater detail later in connection with FIGS. 6, 7, and 8.

The data access module(s) 410 can be a hardware-implemented module which can provide data storage and/or access. For example, the data access module(s) 410 can access the search results data. As used herein, the operation of accessing includes receiving the search results data from the search engine directly and can also include accessing a data memory device storing the search results data. As such, the data access module(s) 410 can interface with the database 126 of FIG. 1

The web-front module(s) 412 can be a hardware-implemented module which can provide data for displaying web resources on client devices. For example, the search system 400 can provide a webpage for displaying the SRP data, such as the user interfaces 300A, 330B of FIGS. 3A and 3B.

Example Data Structures

Figure 5:
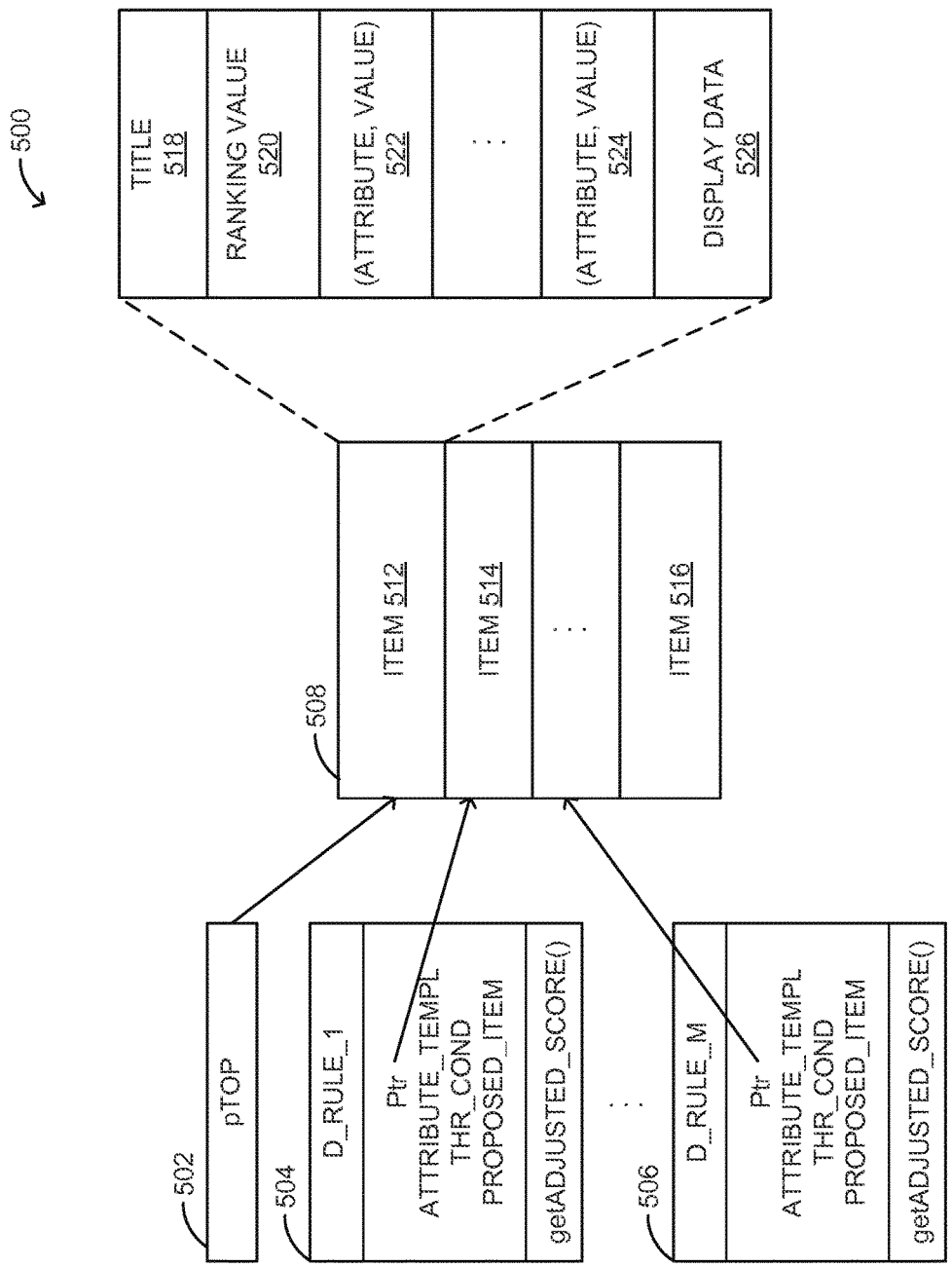
FIG. 5 is a block diagram illustrating an example data structure interaction for a search system, in accordance with an example embodiment.

FIG. 5 is a block diagram illustrating an example data structure interaction 500 for a search system 400, in accordance with an example embodiment. The data structure interaction 500 can include a pointer pTOP 502, one or more data objects 504, 506, and search results data 508. The search results data 508 can include one or more data fields 512-516 corresponding to the items of the search results data 508. Each item of the search results data 508 can include data fields 518-526.

The pointer pTOP 502 can be indicative of the highest ranked unplaced item of the search results data 508. Each of the one or more data objects 504, 506 can correspond to a soft rule. For example, the data object 504 can correspond to a soft rule labeled R_RULE_1. To this end, the data object 504 can include a pointer Ptr that includes data indicative of or referencing an item of the search results data 508. In operation, the pointer Ptr can be indicative of an item to be placed next in the SRP data as an alternative to the default item pointed to by the pointer pTOP 502. The data object 504 can further include a data field ATTRIBUTE_TEMPL that is indicative of an attribute-template pair associated with the soft rule D_RULE_1. The data object 504 can further include a data field THR_COND that is indicative of a threshold condition (e.g., type-value pair) of the soft rule D_RULE_1. The data object 504 can further include a member function getADJUSTED_SCORE( ) for determining an adjusted diversity score associated with the soft rule D_RULE_1. Each of the one or more objects 504-506 can have similar structures as described above.

As stated, each of the data fields 512-516 corresponds to an item of the search results data 508. For example, the data field 512 includes the data field 518 for data that is indicative of a title of the corresponding item. The data field 520 can correspond to a ranking value, such as a score or ranking. The data field 520 can be omitted in example embodiments in which the items of the data fields 512-516 of the search results data 508 are ordered based on a ranking of the items. The data fields 522-524 can correspond to the one or more attribute-value pairs associated with the corresponding item. The data field 526 can include display data for rendering the SRP data on a user device. For example, the data field 526 can include text data, such as a description or summary of the item, and/or can include graphical data.

Example Methods of Diversifying Search Results

Figure 6:
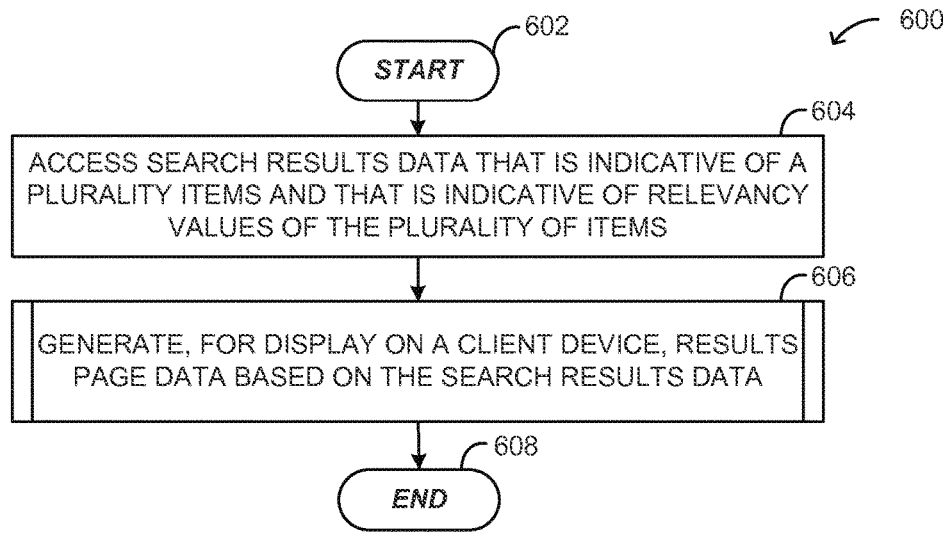
FIG. 6 is a flowchart illustrating an example method of generating search results page data based on search results data, in accordance with an example embodiment.

FIG. 6 is a flowchart illustrating an example method 600 of generating SRP data based on search results data 508, in accordance with an example embodiment. In this example, the method 700 can include operations such as accessing search results data 508 indicative of a plurality of items and indicative of ranking values of the plurality of items (block 604) and generating SRP data based on the search results data 508 (block 606). The example method 600 will be described below, by way of explanation, as being performed by certain modules. It will be appreciated, however, that the operations of the example method 600 can be performed in any suitable order by any number of the modules shown in FIG. 4.

The method 600 starts at block 602 and proceeds to blocks 604 for accessing search results data 508. For example, the data access module(s) 410 can receive the search results data 508 from the search engine module(s) 406 and/or retrieve the search results data 508 from the database 126 of FIG. 1. The search results data 508 can be indicative of ranking values of the plurality of items and one or more attributes of each of the items. An example of the search results data can correspond to the search results data 508 of FIG. 5.

At block 606, the controller module(s) 404 can generate SRP data based on the search results data 508. The SRP data is to be generated for display on a user device, such as the client machine 110 of FIG. 1. The controller module(s) 404 can generate the SRP data based on the search results data 508 by selectively reordering the items of the search results data 508 based on one or more soft rules. An example method of performing the block 606 will be described in greater detail in connection with FIGS. 7 and 8. At block 608, the method 600 can end.

Figure 7:
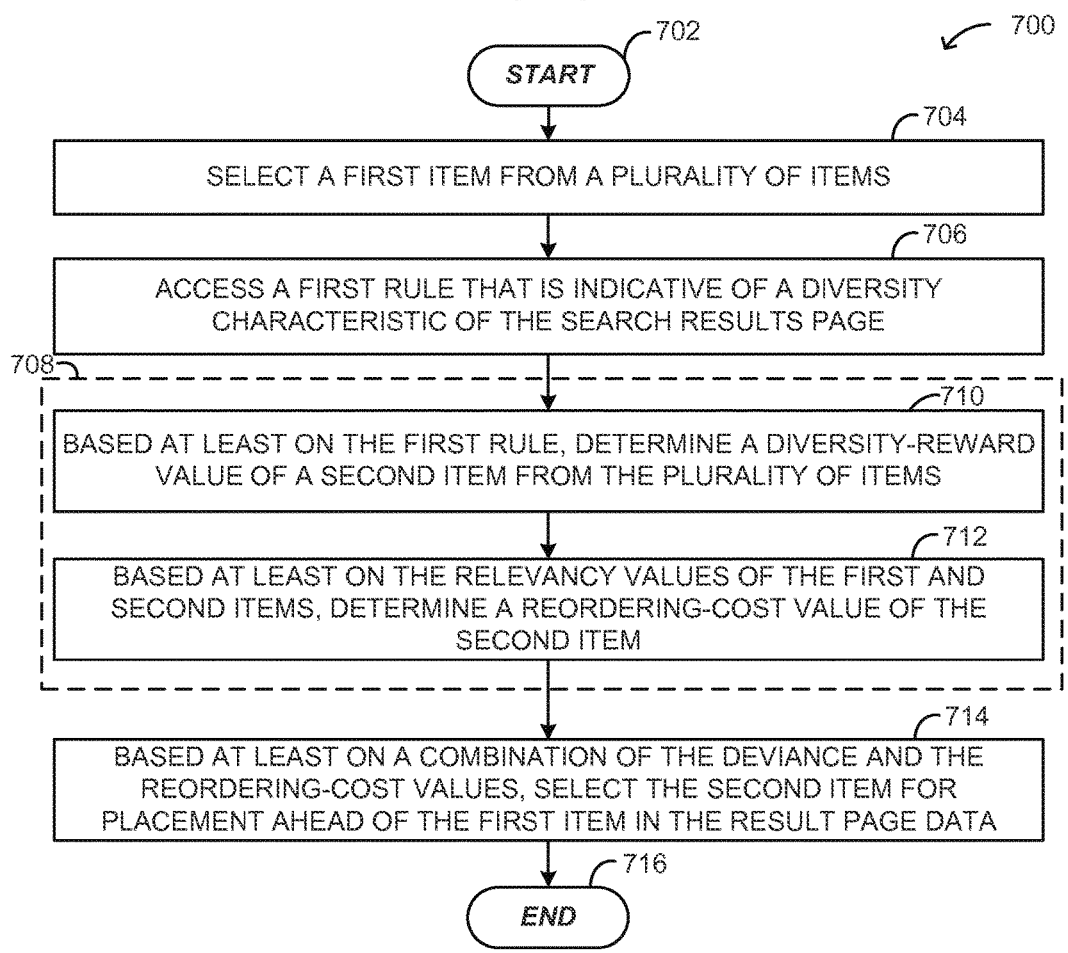
FIG. 7 is a flowchart illustrating an example method of placing items of the search results data in the search results page data of FIG. 6, in accordance with an example embodiment.

FIG. 7 is a flowchart illustrating an example method 700 of placing items of the search results data 508 in the SRP data of FIG. 6, in accordance with an example embodiment. In an example embodiment, the method 700 can be performed at block 606 of FIG. 6. In the illustrated example, the method 700 can include operations such as selecting a first item from a plurality of items (block 704), accessing a first soft rule (block 706), determining an adjusted diversity score of a second item (block 708) by determining a deviance value (block 710) and determining a reordering-cost value (block 712), and selecting the second item for placement ahead ofa first item in the SRP data (block 714). The example method 700 will be described below, by way of explanation, as being performed by certain modules. It will be appreciated, however, that the operations of the example method 700 can be performed in any suitable order by any number of the modules shown in FIG. 4.

The method 700 starts at block 702 and proceeds to block 704 for selecting a first item from a plurality of items. For example, the controller module(s) 404 can set the pointer pTOP 502 to the unplaced item of the search results data 508 having the highest ranking value (e.g., a score or ranking).

At block 706, the diversity module(s) 408 can access a first soft rule that is indicative of a diversity characteristic of the search results page. For example, the first soft rule can correspond to the data object D_RULE_1 504 of FIG. 5. Furthermore, the diversity module(s) 408 can access additional data objects of 504-506 for each additional soft rule.

At block 708, the diversification module 408 can determine an adjusted diversity score associated with a first soft rule. For example, the diversification module(s) 408 can call the member function get_ADJUSTED_SCORE( ) of the data object 504. The adjusted diversity score can be based on a combination of the deviance value and the reordering-cost value (e.g., in accordance with Equation 1 or Equation 2).

Accordingly, the block 708 can include the blocks 710 and 712 for determining the adjusted diversity score.

At block 710, the diversification module(s) 408 can determine the deviance value of a second item from the plurality of items. For example, the second item can have a lower ranking value relative to the first item but can contribute to satisfying the first soft rule if selected to the SRP data. The determination of the deviance value can be based at least on the first soft rule. An example embodiment of the deviance value calculation will be described in greater detail in connection with FIG. 8.

At block 712, the diversity module 408 can determine the reordering-cost value of the second item. For example, the reordering-cost value can be determined based at least on the ranking values of the first and second items. An example embodiment of a reordering-cost value calculation will be described in greater detail in connection with FIG. 8.

At block 714, the controller module(s) 404 can select the second item for placement ahead of the first item in the SRP data selectively based on the adjusted diversity score. For example, the controller module 404 can determine whether the combination of the deviance value and the reordering-cost values is a net positive value. In response to a determination that the combination is a net positive value, the controller module(s) 404 can select the second item to be placed in the SRP data instead of the first item at the current round of selection. In response to a determination that the combination is not a net positive value, the controller module(s) 404 can select the first item to be placed in the SRP data instead of the second item at the current round.

It will be appreciated that in example embodiments the block 706 and 708 can be repeated for multiple soft rules in order to determine respective adjusted diversity values of candidate items to be placed ahead of the first item. Furthermore, the controller module(s) 404, at the block 714, can select the candidate item having the greatest adjusted diversity value to be placed in the SRP data ahead of the first item. At block 716, the method 700 can end.

Figure 8:
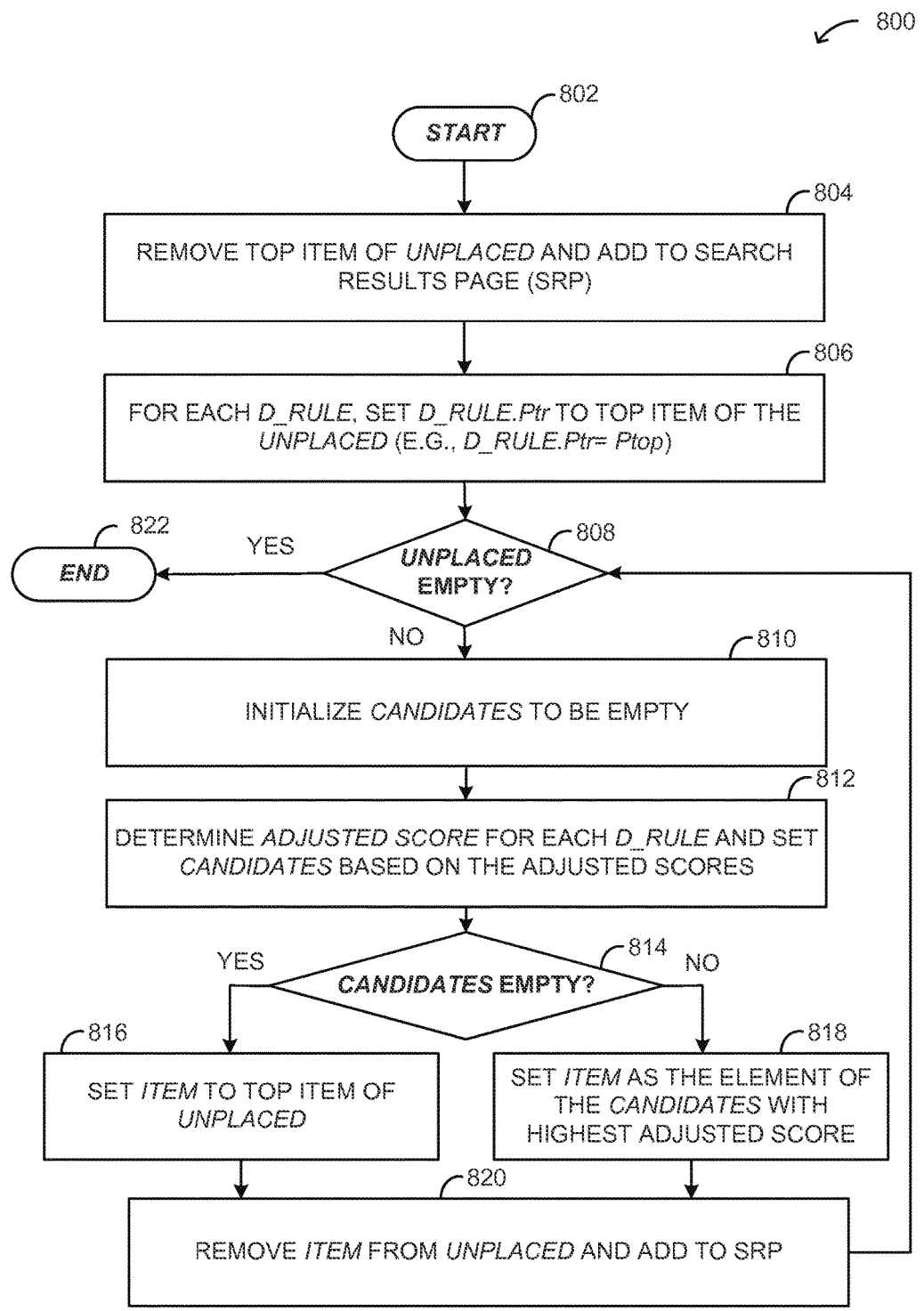
FIG. 8 is a flowchart illustrating an example method of diversifying search results data, in accordance with an example embodiment.

FIG. 8 is a flowchart illustrating an example method 800 of diversifying search results data 508, in accordance with an example embodiment. In an example embodiment, the method 800 can include a particular embodiment of the method 600 of FIG. 6. In this example, the method 800 can include operations such as removing the top item of unplaced and adding it to the SRP data (block 804), setting D_RULE.Ptr (block 806), initializing candidates to be empty (block 810), determining an adjusted score for D_RULE and setting candidates based on the adjusted score (block 812), setting item to top item of unplaced (block 816), setting item as the element of the candidates with highest adjusted score (block 818), and removing item from unplaced and adding it to SRP data (block 820). The example method 800 will be described below, by way of explanation, as being performed by certain modules. It will be appreciated, however, that the operations of the example method 800 can be performed in any suitable order by any number of the modules shown in FIG. 4. A pseudocode example of the method 800 is provided below.

---

Diversity Algorithm

Input: a list of unplaced items, sorted by score.
Output: items in their final arrangement for display on the SRP
  1: Remove the top item from unplaced and append it to SRP
  2: For every soft rule D_RULE, set D_RULE.Ptr := first unplaced item

---

-continued

Diversity Algorithm

3: while unplaced is not empty do
  4:    initialize the set candidates to be empty
  5:    foreach D_RULE in set of soft rules do
  6:      if D_RULE.getAdjusted_Score( ) > 0 then
         add D_RULE.Ptr to the candidates end
  7:    end foreach
  8:    if candidates = empty then
  9:      set item to be the top (highest score) item on unplaced
10:    else
12:      set item := the D_RULE.PROPOSED_ITEM in candidates with the largest score
13:    end if
14:    if there are any D_RULE.Ptr pointing at item, move them down one
15:    remove item from unplaced and append it to SRP;
16: End while

---

The method 800 and the Diversity Algorithm depicted above is discussed in connection with FIGS. 4 and 5. The search results data 508 of FIG. 5 can be received as input and can correspond to the unplaced items of the Diversity Algorithm. Moreover, the data objects D_RULE_I 504, . . . , D_RULE_M 506 can correspond to a number of soft soft rules D_RULE of the Diversity Algorithm. The controller module(s) 404 can execute the pseudocode of the Diversity Algorithm.

At block 802, the method 800 can start and then proceed to block 804 for removing the top item of unplaced and adding it to the SRP data, as shown at line 1 of the Diversity Algorithm. For example, the controller module(s) 404 can append the data field 512 to the SRP data and move the pointer pTOP 502 to the data field 514.

At block 806, the controller module(s) 404 can set the data field Ptr of the data objects D_RULE_I 504, . . . , D_RULE_M 506 to the top item of unplaced (e.g., data field 514 of the search results data 508).

At block 808, the controller module(s) 404 can determine whether unplaced is empty. If unplaced is empty, the method 800 can end at block 822. Otherwise, the method 800 can continue to block 810 for initializing the candidates to be empty. At block 812, the controller module(s) 404 can call each of the data objects D_RULE_1 504-D_RULE_M 506, which correspond to the soft rules, to determine their respective adjusted diversity scores. A pseudocode example of the block 812 is provided below.

---

D_RULE.getADJUSTED_SCORE( )

1: n := number of items placed in SRP so far;
  2: f := D_RULE.THR_COND.VALUE // the bound for this constraint ;
  3: k := the number of items placed so far that satisfy D_RULE;
  4: // For the any property, k is the max number of items with the same property
     // value that satisfy the constraint;
  5: if D_RULE. THR_COND.TYP = 'MIN' then
  6:    deviance:= ((n + 2)f − k − 1)+
  7: else
  8:    deviance:= (k + 1 − (n + 2)f)+
  9: end
10: Starting at D_RULE.Ptr, scan down unplaced until reaching an item I that will reduce deviance;
11: D_RULE.Ptr := I ;
12: $I_{default}$ := highest scoring unplaced item ;
13: reorder cost := S(I) − S($I_{default}$) ;
14: adjusted_score := deviance − reorder cost ;
15: // set proposed item field and return ;

-continued

```
D_RULE.getADJUSTED_SCORE( )
16: D_RULE.PROPOSED_ITEM := I ;
17: return(adjusted_score) ;
```

Lines 1-3 correspond to initializing the variables n, f, and k. The variable n corresponds to the number of items placed in SRP data from the search results data 508. The variable f corresponds to the threshold value of the soft rule. The variable k corresponds to the number of items placed so far that satisfy the corresponding soft rule. At line 6 or 8, the deviance value is determined. Line 6 can be executed in response to a determination that the threshold condition type corresponds to a minimum threshold characteristic. Line 8 can be executed in response to a determination that the threshold condition type corresponds to a maximum threshold characteristic. In lines 6 and 8, the operator+ corresponds to a positive threshold operator such that $x+=x$ when $x>0$, and $x+=0$ otherwise.

At line 10, the diversification module(s) 408, starting at D_RULE.Ptr, scans down unplaced until it reaches an item I that can decrease the deviance value of D_RULE. In other words, the item I contributes to meeting the soft rule of D_RULE since placing the item I would reduce the need to add diversity under the corresponding soft rule D_RULE. At lines 11 and 12, the diversification module(s) 408 can set the D_RULE.Ptr to I and Idefault to the highest unplaced item with respect to ranking (e.g., referenced by pTOP). At line 13, the diversification module(s) 408 determines the reordering-cost value based on the difference in the ranking value of Idefault and the ranking value of I. The adjusted diversity score is determined at line 14. At lines 16 and 17, the PROPOSED ITEM field is set and the adjusted diversity score is returned.

At block 814, the controller module(s) 404 determines whether or not candidates is empty. In response to a determination that candidates is empty, the method 800 proceeds to block 816 for setting item to the top item of unplaced. In response to a determination that candidates is not empty, the method 800 proceeds to block 818 for setting item instead as the element of candidates with the highest adjusted diversity score. In one example embodiment, the blocks 814-818 can be performed by the controller module(s) 404.

At block 820, the controller module(s) 404 can remove item from unplaced and add it to SRP as the next item. Then, the controller module(s) 404 can return to block 808 to determine whether unplaced is empty and end at block 822 or if unplaced is nonempty, repeat blocks 810-820.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network 104 (e.g., the Internet) and via one or more appropriate interfaces (e.g., application program interfaces (APIs).)

Electronic Apparatus and System

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network 104.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., a field programmable gate array (FPGA) or an application-specific integrated circuit (ASIC).

The computing system can include clients and servers. A client and server are generally remote from each other and typically interact through a communication network 104. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Example Machine Architecture and Machine-Readable Medium

Figure 9:
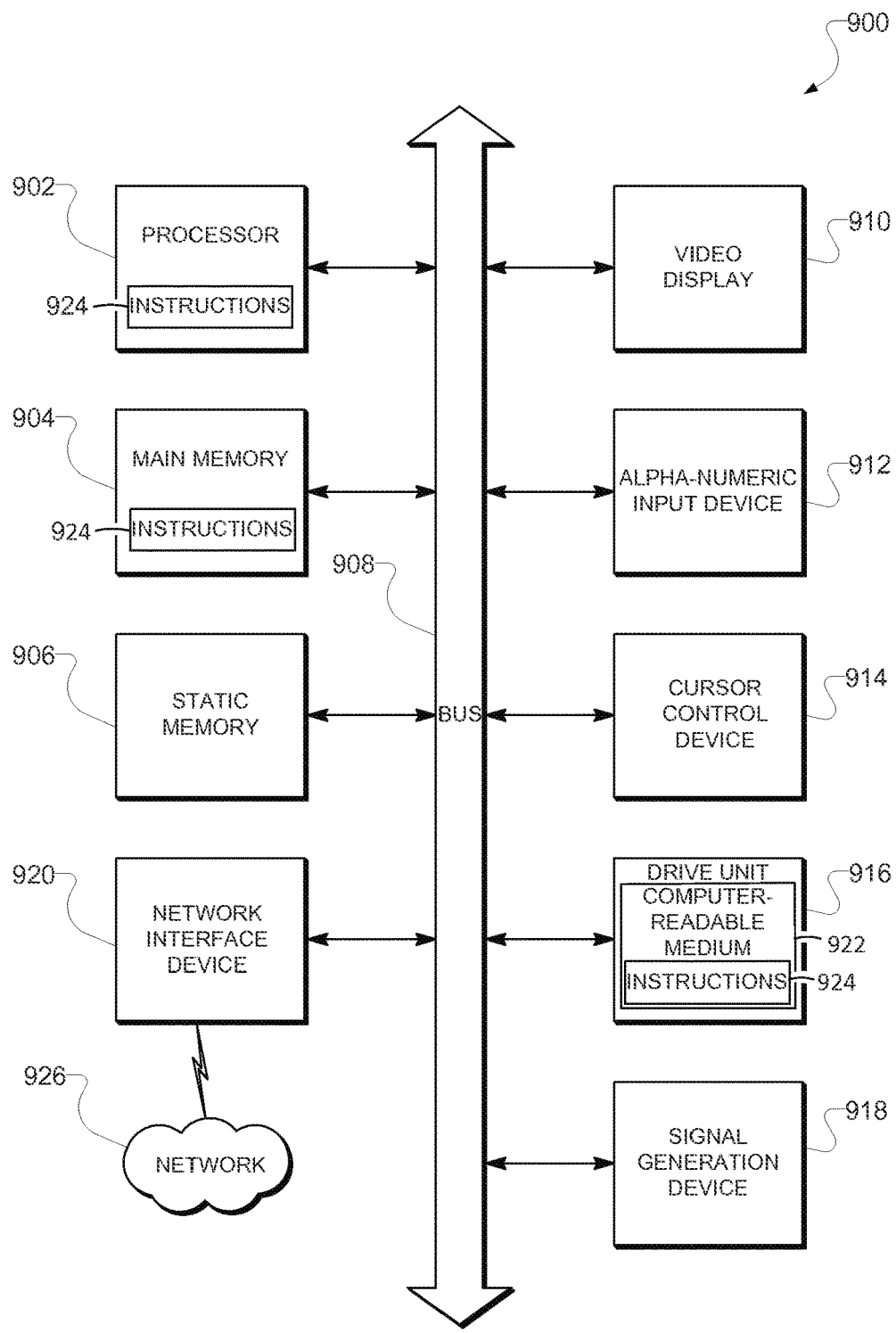
FIG. 9 is a block diagram of a machine in the example form of a computer system within which instructions can be executed for causing the machine to perform any one or more of the methodologies discussed herein.

FIG. 9 is a block diagram of a machine in the example form of a computer system 900 within which instructions 924 can be executed for causing the machine to perform any one or more of the methodologies discussed herein. In alternative embodiments, the machine operates as a stand-alone device or can be connected (e.g., networked) to other machines. In a networked deployment, the machine can operate in the capacity of a server or a client machine 110 in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute a set (or multiple sets) of instructions 924 to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 can further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation (or cursor control) device 914 (e.g., a mouse), a disk drive unit 916, a signal generation device 918 (e.g., a speaker) and a network interface device 920.

Machine-Readable Medium

The disk drive unit 916 includes a computer-readable medium 922 on which is stored one or more sets of data structures and instructions 924 (e.g., software) embodying or utilized by any one or more of the methodologies or functions described herein. The instructions 924 can also reside, completely or at least partially, within the main memory 904 and/or within the processor 902 during execution thereof by the computer system 900, the main memory 904 and the processor 902 also constituting machine-readable media 922.

While the computer-readable medium 922 is shown, in an example embodiment, to be a single medium, the term "computer-readable medium" can include a single medium or multiple media (e.g., a centralized or distributed database, and/or associated caches and servers) that store the one or more instructions 924 or data structures. The term "computer-readable medium" shall also be taken to include any non-transitory, tangible medium that is capable of storing, encoding or carrying instructions 924 for execution by the machine and that cause the machine to perform any one or more of the methodologies of the present inventive subject matter, or that is capable of storing, encoding or carrying data structures utilized by or associated with such instructions 924. The term "computer-readable medium" shall accordingly be taken to include, but not be limited to, solid-state memories, and optical and magnetic media. Specific examples of computer-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 can further be transmitted or received over a communications network 926 using a transmission medium. The instructions 924 can be transmitted using the network interface device 920 and any one of a number of well-known transfer protocols (e.g., HTTP). Examples of communication networks 926 include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions (e.g., instructions 924) for execution by the machine, and includes digital or analog communications signals or other intangible media to facilitate communication of such software.

Although the inventive subject matter has been described with reference to specific example embodiments, it will be evident that various modifications and changes can be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A system comprising:
   one or more processors; and
   one or more computer storage media storing computer-usable instructions that, when used by the one or more processors, cause the one or more processors to:
   determine for each database record included in search result data retrieved from a database in response to a search query received from a remote client device, a corresponding rank based on a determined relevancy of the database record;
   select a first database record having a first corresponding rank in the retrieved search result data to add into a first position of a search result dataset, wherein each database record is selected from the retrieved search result data based on a defined set of data diversity rules for addition to the search result dataset;
   determine that at least one rule in the defined set of data diversity rules is violated when a second database record having a second corresponding rank directly behind the first corresponding rank in the retrieved search result data is considered for addition into a second position directly behind the first position of the search result dataset; and
   based at least in part on the determination that less than the at least one rule is violated when a third database record having a third corresponding rank in the retrieved search result data is considered for addition into the second position directly behind the first position of the search result dataset, add the third database record into the second position directly behind the first position of the search result dataset.

2. The system of claim 1, wherein the defined set of data diversity rules includes a first rule that defines one of a maximum or a minimum percentage of database records included in the search result dataset having a particular attribute.

3. The system of claim 2, wherein the particular attribute is one of a product name, a brand name associated with the product, a condition of the product, or a description of the product.

4. The system of claim 1, wherein each data diversity rule in the defined set of data diversity rules is one of a soft constraint or a hard constraint, wherein the soft constraint is a preferred rule and the hard constraint is required rule.

5. The system of claim 1, wherein the search result dataset is provided to the remote client device for display via at least one webpage based at least in part on each database record included in the retrieved search result data having been added to the search result dataset.

6. The system of claim 1, wherein each webpage of the at least one webpage includes a corresponding portion of the search result dataset that satisfies the defined set of data diversity rules.

7. A computer-implemented method to diversify generation of search results data, the method comprising:
   determining, by a server, for each database record included in search result data retrieved from a database in response to a search query received from a remote client device, a corresponding rank based on a determined relevancy of the database record;
   selecting, by the server, a first database record having a first corresponding rank in the retrieved search result data to add into a first position of a search result dataset, wherein each database record is selected from the retrieved search result data based on a defined set of data diversity rules for addition to the search result dataset;
   determining, by the server, that at least one rule in the defined set of data diversity rules is violated when a second database record having a second corresponding rank directly behind the first corresponding rank in the retrieved search result data is considered for addition into a second position directly behind the first position of the search result dataset; and
   based at least in part on the determination that less than the at least one rule is violated when a third database record having a third corresponding rank in the retrieved search result data is considered for addition into the second position directly behind the first position of the search result dataset, adding the third database record into the second position directly behind the first position of the search result dataset.

8. The computer-implemented method of claim 7, wherein the defined set of data diversity rules includes a first rule that defines one of a maximum or a minimum percentage of database records included in the search result dataset having a particular attribute.

9. The computer-implemented method of claim 7, wherein each data diversity rule in the defined set of data diversity rules is one of a soft constraint or a hard constraint, wherein the soft constraint is a preferred rule and the hard constraint is required rule.

10. The computer-implemented method of claim 7, wherein the search result dataset is provided to the remote client device for display via at least one webpage based at least in part on each database record included in the retrieved search result data having been added to the search result dataset.

11. The computer-implemented method of claim 10, wherein each webpage of the at least one webpage includes a corresponding portion of the search result dataset that satisfies the defined set of data diversity rules.

12. A machine-readable storage medium embodying instructions that, when executed by a machine, cause the machine to perform operations comprising:
- determining for each database record included in search result data retrieved from a database in response to a search query received from a remote client device, a corresponding rank based on a determined relevancy of the database record;
- selecting a first database record having a first corresponding rank in the retrieved search result data to add into a first position of a search result dataset, wherein each database record is selected from the retrieved search result data based on a defined set of data diversity rules for addition to the search result dataset;
- determining that at least one rule in the defined set of data diversity rules is violated when a second database record having a second corresponding rank directly behind the first corresponding rank in the retrieved search result data is considered for addition into a second position directly behind the first position of the search result dataset; and
- based at least in part on the determination that less than the at least one rule is violated when a third database record having a third corresponding rank in the retrieved search result data is considered for addition into the second position directly behind the first position of the search result dataset, adding the third database record into the second position directly behind the first position of the search result dataset.

13. The machine-readable storage medium of claim 12, wherein the defined set of data diversity rules includes a first rule that defines one of a maximum or a minimum percentage of database records included in the search result dataset having a particular attribute.

14. The machine-readable storage medium of claim 12, wherein each data diversity rule in the defined set of data diversity rules is one of a soft constraint or a hard constraint, wherein the soft constraint is a preferred rule and the hard constraint is required rule.

15. The machine-readable storage medium of claim 12, wherein the search result dataset is provided to the remote client device for display via at least one webpage based at least in part on each database record included in the retrieved search result data having been added to the search result dataset.

* * * * *